United States Patent
Benayoun et al.

(10) Patent No.: US 7,273,658 B2
(45) Date of Patent: *Sep. 25, 2007

(54) CROSSLINKING AGENT FOR A CROSSLINKABLE SILICONE COMPOSITION WITH A LOW LEVEL OF PLATINUM BASED ON A HYDROGENATED SILICONE OIL COMPRISING SI-H UNITS AT THE CHAIN END AND IN THE CHAIN

(75) Inventors: Jean-Paul Benayoun, Lyons (FR); Didier Dhaler, Tassin (FR); Jacques Kieffer, Neyron (FR); John White, Chessy les Mines (FR)

(73) Assignee: Rhodia Chimie, Aubervilliers (FR)

( * ) Notice: Subject to any disclaimer, the term of this patent is extended or adjusted under 35 U.S.C. 154(b) by 178 days.

This patent is subject to a terminal disclaimer.

(21) Appl. No.: 10/499,671

(22) PCT Filed: Dec. 19, 2002

(86) PCT No.: PCT/FR02/04452

§ 371 (c)(1),
(2), (4) Date: Nov. 24, 2004

(87) PCT Pub. No.: WO03/054059

PCT Pub. Date: Jul. 3, 2003

(65) Prior Publication Data

US 2005/0075020 A1    Apr. 7, 2005

(30) Foreign Application Priority Data

Dec. 21, 2001    (FR) .................................. 01 16729

(51) Int. Cl.
*B32B 9/04*    (2006.01)

(52) U.S. Cl. ...................... 428/447; 525/477; 525/479; 528/15; 528/31; 528/32

(58) Field of Classification Search .................... None
See application file for complete search history.

(56) References Cited

U.S. PATENT DOCUMENTS 5,194,489 A * 3/1993 Frances et al. ............. 524/731
5,216,104 A * 6/1993 Okami et al. .................. 528/15
5,942,591 A    8/1999 Itoh et al.

FOREIGN PATENT DOCUMENTS

| EP | 0 371 404 | 6/1990 |
| EP | 0 523 660 | 1/1993 |
| EP | 0 851 001 | 7/1998 |
| EP | 1004632   | 5/2000 |
| FR | 2 704 553 | 11/1994 |

* cited by examiner

Primary Examiner—Marc S. Zimmer
(74) Attorney, Agent, or Firm—Buchanan, Ingersoll & Rooney, PC

(57) ABSTRACT

The invention concerns crosslinkable silicone compositions, useful for forming water-repellent and release coating for flexible heat-sensitive support. Said compositions comprise crosslinking polyorganosiloxanes (POS) bearing ≡Si—H units and unsaturated POS, for example ≡Si-Vi vinyl-containing POS, capable of reacting with the crosslinking agent by polyaddition, in the presence of platinum to form a release crosslinked coat on the flexible support. The invention aims at instantaneously enabling low platinum content crosslinking of such silicone compositions, coated at high speed. Therefor, the invention provides for the use of particular crosslinking agents consisting of hydrogenated POS comprising at least three hydrogen atoms bound to the silicon located at chain end and in the chain. The invention also concerns solvent-free or emulsion-type silicone compositions comprising the ≡Si-Vi POS (I.1), the crosslinking agent ≡Sl-H POS (I.2) and the platinum catalyst among others. The invention is useful for coating flexible supports, for example made of Lissé BEKK>1000 paper.

14 Claims, No Drawings

US 7,273,658 B2

CROSSLINKING AGENT FOR A CROSSLINKABLE SILICONE COMPOSITION WITH A LOW LEVEL OF PLATINUM BASED ON A HYDROGENATED SILICONE OIL COMPRISING SI-H UNITS AT THE CHAIN END AND IN THE CHAIN

This disclosure is based upon French Application No. 01/16,729, filed Dec. 21, 2001, and International Application No. PCT/FR02/04452, filed Dec. 19, 2002, the contents of which are incorporated herein by reference.

The field of the invention is that of crosslinkable or crosslinked silicone compositions capable of being used in particular to form a water-repellent and release coating or film on a fibrous or nonfibrous support, for example made of paper or the like, or alternatively made of natural or synthetic polymers.

More specifically, the invention relates to silicone compositions of the type of those comprising:

functionalized polyorganosiloxanes (POS) carrying, on the same molecule or not, Si—H and Si—IE units with IE representing a group comprising at least one ethylenic, preferably vinyl, unsaturation; the Si—H units being capable of reacting with the Si—IE units by polyaddition;

an appropriate metal catalyst, preferably a platinum catalyst;

optionally at least one adhesion-adjusting system, for example based on silicone resin comprising Q ($SiO_{4/2}$) and/or T ($RSiO_{3/2}$) siloxyl units;

optionally other additives (fillers, accelerators, inhibitors, pigments, surfactants, and the like).

The invention also relates to the preparation of silicone compositions of this type.

The invention also relates to the processes for the manufacture of articles made of crosslinked silicone, in particular coatings, e.g. water-repellent and/or release coatings, for fibrous or nonfibrous flexible supports (paper or polymer film), from the compositions targeted above.

For example, these liquid silicone compositions (with/without solvent or in aqueous emulsion) are applied to support films in industrial coating devices comprising rolls operating at a very high speed (for example 600 m/min). It is obvious that, in these very high-speed coating procedures the viscosity of the liquid silicone coating composition must be precisely adapted to the coating operating conditions.

The liquid silicone coating compositions of more particular interest in the context of the invention are solvent-free.

According to an alternative form, the silicone phase of these liquid silicone coating compositions can be diluted in a solvent. According to another more advantageous alternative form, in particular for reasons of health and safety, the liquid silicone composition is an aqueous dispersion/emulsion.

In practice, the degree of deposition of release silicone is between 0.1 and 2 $g/m^2$, preferably 0.3 and 1 $g/m^2$, which corresponds to thicknesses of the order of a micrometer.

Once applied to the flexible support, the silicone composition crosslinks to form a firm, release and/or water-repellent, coating made of silicone (e.g. elastomer).

In the case of solvent-free liquid silicone systems which crosslink by polyaddition [Si—H/Si-alkenyl-(Vi)-], crosslinking is carried out under thermal activation.

In view of the very high-speed industrial coating rates, the kinetics of crosslinking have to be instantaneous and the crosslinking has to be correct, that is to say that the release silicone films have to be sufficiently crosslinked to be able to fulfill as best as possible their release role and to possess the desirable mechanical qualities. The assessment of the quality of the crosslinking of the release silicone film can be carried out in particular through quantitative determination of the uncrosslinked extractable compounds, the amount of which must be as small as possible.

The ability to release of the free outer face of the silicone coating is expressed through the detachment force, which has to be weak and controlled, for the element intended to be positioned on the support coated by the release silicone film. Conventionally, this element can be the adhesive face of a label or of a tape of the same kind.

Thus, in addition to this weak and controlled ability to release, the adhesion of the silicone coating to its support has to be very high. This property of adhesion is assessed, for example, using the rub off trade test, which consists in rubbing the surface of the coating with a finger and then measuring the number of successive passes which result in damage to the coating.

It is also important for these silicone coating compositions which can be crosslinked by hydrosilylation, e.g. ≡Si—H/≡Si—Vi, to have a lifetime at ambient temperature which is as long as possible, when they are in the form of a coating bath in industrial coating devices.

The flexible supports coated with a release silicone film can be, for example:

an adhesive tape, the inner face of which is coated with a layer of pressure-sensitive adhesive and the outer face of which comprises the release silicone coating;

or a paper or a polymer film for protecting the adhesive face of a self-adhesive element or pressure-sensitive adhesive;

or a polymer film of the Poly(Vinyl Chloride) (PVC), PolyPropylene, PolyEthylene or PolyEthylene Terephthalate) type.

Another major constraint in these silicone coating compositions which can be crosslinked by hydrosilylation, e.g. ≡Si—H/≡Si-Vi, in the presence of platinum is specifically related to their platinum content. This is because platinum is, because of its cost, a dominating element in the cost price of a polyaddition system, in particular for the release and/or water repellent silicone coating application for flexible supports (paper or polymer film).

In point of fact, if, for reasons of economy, the level of platinum is reduced to a level of less than 100 ppm, indeed even of less than 80 ppm, in the composition, it is then no longer possible to obtain fully crosslinked release and/or water-repellent silicone coatings. The use of crosslinking agents of the type of those comprising siloxyl units: dimethylhydrosiloxyl (M'), methylhydrosiloxyl (D'), dimethylsiloxyl (D) and trimethylsiloxyl (M), for liquid silicone compositions which can be crosslinked by polyaddition (≡Si—H/Si-Vinyl), to form release coatings on flexible supports (coated or uncoated paper, polymer films, and the like), is generally already disclosed.

This is thus the case in Patent Application EP A-0 523 660, which discloses silicone compositions which can be crosslinked in a few seconds at temperatures below 100° C. and which comprise network (nonlinear) ≡Si-Vi POS resins and ≡Si—H POS crosslinking agents of MD', MDM' type. It is not at all shown in this document that the crosslinking of the silicone films obtained is correct for low levels of platinum (less than 100 ppm). The level of extractables is not measured in the examples. The only level of platinum mentioned in the latter is 100 ppm.

EP-A-0 523 660 does not relate to a specific ≡Si—H POS crosslinking agent which confers advantageous properties on the crosslinked coating in terms of reduced level of extractables and of duration of stability of the bath of liquid silicone coating composition, in particular.

In this context, an essential object of the present invention is to provide a novel use of specific ≡Si—H POSs as crosslinking agents in liquid silicone coating compositions which can be crosslinked instantaneously under thermal activation, with a low level of metal catalyst (e.g. Pt), to give a release and/or water-repellent coating for a flexible support, while resulting in crosslinked silicone coatings of very good quality characterized by reduced levels of extractables which furthermore have excellent attachment properties, in particular to smooth supports, for example made of glassine paper with a Bekk smoothness of greater than 1000.

Another essential object of the invention is to provide a novel use of specific ≡Si—H POSs as crosslinking agents in liquid silicone coating compositions which can be crosslinked instantaneously under thermal activation, with a low level of metal catalyst (e.g. Pt), to give a release and/or water-repellent coating for a flexible support, while exhibiting long bath lifetimes at ambient temperature.

Another essential object of the invention is to provide a novel use of specific ≡Si—H POSs as crosslinking agents in liquid silicone coating compositions which can be crosslinked instantaneously under thermal activation, with a low level of metal catalyst (e.g. Pt), to give a release and/or water-repellent coating for a flexible support and which result in correctly crosslinked silicone coatings having entirely satisfactory release properties.

Another essential object of the invention is to provide a novel use of specific ≡Si—H POSs as crosslinking agents in liquid silicone coating compositions which can be crosslinked instantaneously under thermal activation, with a low level of metal catalyst (e.g. Pt), to give a release and/or water-repellent coating for a flexible support and which result in correctly crosslinked silicone coatings having entirely satisfactory attachment properties.

Another essential object of the invention is to provide a novel use of specific ≡Si—H POSs as crosslinking agents in liquid silicone coating compositions which can be crosslinked instantaneously under thermal activation, with a low level of metal catalyst (e.g. Pt), to give a release and/or water-repellent coating for a flexible support and which result in correctly crosslinked silicone coatings having entirely satisfactory mechanical properties.

Another essential object of the invention is to provide a novel use of specific ≡Si—H POSs as crosslinking agents in liquid silicone coating compositions which can be crosslinked instantaneously under thermal activation, with a low level of metal catalyst (e.g. Pt), to give a release and/or water-repellent coating for a flexible support and which result in correctly crosslinked silicone coatings having entirely satisfactory water-repelling properties.

Another essential object of the invention is to provide a novel liquid silicone coating composition which can be crosslinked instantaneously under thermal activation, with a low level of metal catalyst (e.g. Pt), to give a release and/or water-repellent coating for a flexible support, this composition additionally having the same qualities as those mentioned above for the use.

Another essential object of the invention is to provide a novel liquid silicone coating composition which can be crosslinked instantaneously under thermal activation, with a low level of metal catalyst (e.g. Pt), to give a release and/or water-repellent coating for a flexible support, this composition additionally being easy to prepare and economical.

Another essential object of the invention is to provide a process for the production under thermal activation, with a low level of metal catalyst (e.g. Pt), of release and/or water-repellent crosslinked silicone coatings on flexible supports.

These objects, among others, are achieved by the present invention, which relates first to a novel use as crosslinking agent (I.2), in a silicone composition capable of crosslinking by polyaddition to form a water-repellent and release coating for a fibrous or nonfibrous support, of at least one silicone oil comprising at least one hydrogenated (preferably linear) PolyOrganoSiloxane (POS) exhibiting, per molecule, at least three hydrogen atoms bonded to silicon atoms, and preferably having the following mean formula:

$$M_\alpha M'_\beta D_\gamma D'_\delta$$

with
$M=(R^1)_3SiO_{1/2}$
$M'=H_a(R^1)_b SiO_{1/2}$, a+b=3, a=1, 2 or 3,
b=0 to 3
$D=(R^2)_2 SiO_{2/2}$
$D'=HR^3 SiO_{2/2}$
$0 \leq \alpha \leq 2$
$0 < \beta \leq 2$
$0 < \gamma$
$0 < \delta$
and with:
$0 < \gamma/\delta \leq 0.4$,
$20 \leq (\beta/\delta) \times 1000 \leq 60$, the POS or POSs of higher viscosity of said composition having a dynamic viscosity η at 25° C. of less than or equal to 1500 mPa·s;

the level of metal catalyst being less than or equal to 80 ppm, preferably less than or equal to 65 ppm and more preferably still of between 30 and 55 ppm.

The use according to the invention of carefully selected ≡Si—H POS crosslinking agents makes it possible to produce, with low levels of platinum, therefore economically, release coatings on flexible supports. By virtue of the invention, correct crosslinking of the coating is provided at levels of platinum of less than 80 ppm, preferably of the order of 60 ppm and ideally of 40 ppm, for example, this being the case under industrial coating conditions, e.g. at a temperature of 150° C.

Furthermore, these novel ≡Si—H POS crosslinking agents do not modify the Theological behavior of the silicone composition, so that it is perfectly capable of being coated on any support and in particular on any flexible support.

This final property is all the more advantageous as, in the context of the invention, the silicone coating compositions can advantageously be "solvent-free". This means that they are devoid of solvent and in particular of organic solvent. The advantages which this provides regarding health and safety are easily understood.

The performance achieved by virtue of the invention in terms of quality of the crosslinking by polyaddition: reactivity/level of crosslinking/kinetics, are entirely advantageous, as testified thereto by the low levels of extractables obtained, as regards the reactivity and the level of crosslinking.

It is the same as regards the attachment to supports, in particular to very smooth flexible supports (for example made of paper).

Thus, the use according to the invention is distinguished in that the silicone composition employed can be converted according to a specific methodology M to a crosslinked silicone elastomer coating on a support made of paper with a Bekk smoothness of greater than 1000, said coating being characterized by a positive attachment in a specific test T.

The methodology M and the test T are defined below in the examples.

The formula of the ≡Si—H POS crosslinking agent (I.2) indicated above is an overall formula which covers:
-a- the cases where the ≡Si—H POS crosslinking agent (I.2) comprises the MM'DD' units on the same (preferably linear) POSmolecule, it being possible for the crosslinking agent to comprise one or more different MM'DD' molecules,
-b- the cases where the ≡Si—H POS crosslinking agent (I.2) is formed by a mixture of (preferably linear) POS molecules each carrying a portion of the MM'DD' units,
-c- the cases where the ≡Si—H POS crosslinking agent (I.2) is formed by a mixture of (preferably linear) ≡Si—H POS crosslinking agents (I.2) of -a- and -b- types as described above.

Mention may be made, as examples of ≡Si—H POS crosslinking agents (I.2) of -b- type, of mixtures of ≡Si—H POS comprising M and D' units and of POS comprising M, D and D' units, or mixtures of ≡Si—H POS (I.2) comprising M and D units and of POS comprising M', D and D' units, or mixtures of =Si—H POS (I.2) comprising M and D' units and of POS comprising M and D units, or mixtures of ≡Si—H POS (I.2) comprising M' and D' units and of POS comprising M and D units.

The invention also covers alternative forms in which the crosslinking agent (I.2) comprises hydrogenated POSs carrying T, $RSiO_{3/2}$, or Q, $SiO_{4/2}$, units. It can, for example, be ≡Si—H POS (I.2) with a structure M'DD'QM'.

As emerges from the -b- cases, the crosslinking agent comprising M' and D' units according to the invention can also comprise standard ≡Si—H POS crosslinking agents (I.2) not having M' functional groups.

Preferably, the silicone composition involved in the use according to the invention is composed of ≡Si—H POS (I.2) and of ≡Si-alkenyl (e.g. Vi) POS (I.1) with a linear, optionally branched, structure, with the exclusion of ≡Si—H POS (I.2) and of ≡Si-alkenyl (e.g. Vi) POS (I.1) having a network crosslinked structure.

According to an advantageous form of the invention, the support intended to be coated is made of a heat-sensitive material, preferably a flexible material, and more preferably still is chosen from flexible supports made of paper, board or the like, flexible supports composed of the adhesive face of a label or of a tape of the same kind, woven or nonwoven fibrous flexible supports, flexible supports comprising polyethylene and/or polypropylene and/or polyester and/or poly(vinyl chloride), and/or thermally printable flexible supports.

According to the invention, for the crosslinking of the coating, the support coated with the polyaddition silicone composition is placed at a temperature of greater than or equal to 110° C. preferably of between 110 and 250° C. and more preferably still of between 130 and 170° C., for less than 60 seconds, preferably less than 10 seconds.

Advantageously the silicone composition is a mixture formed of:
(I.1) at least one POS exhibiting, per molecule, at' least two alkenyl groups (preferably $C_2$-$C_6$ alkenyl groups) bonded to silicon atoms,
(I.2) at least one crosslinking ≡Si—H POS as defined above,
(I.3) and/or at least one POS carrying Si-alkenyl and Si—H units, (II) at least one catalyst (II) composed of at least one metal belonging to the platinum group.

Preferably, use is made of at least one POS (I.1) of Si-alkenyl type, for example Si-Vi type, and of at least one POS (I.2) of Si—H type.

The POS (I.1) is, by weight, one of the essential constituents of the formulation.

Advantageously, this POS (I.1) is a product comprising units of formula:

$$W_a Z_b SiO_{\frac{4-(a+b)}{2}} \qquad (I.1)$$

in which:
W is an alkenyl group, preferably a vinyl or allyl group,
Z is a monovalent hydrocarbonaceous group which has no unfavorable effect on the activity of the catalyst and which is preferably chosen from alkyl groups having from 1 to 8 carbon atoms inclusive, advantageously from the methyl, ethyl, propyl and 3,3,3-trifluoropropyl groups, and also from aryl groups, advantageously from the xylyl, tolyl and phenyl radicals,
a is 1 or 2, b is 0, 1 or 2 and a+b is between 1 and 3.

It is advantageous for this polydiorganosiloxane to have a viscosity (at 25° C.) at least equal to 10 mPa·s, preferably between 50 and 1000 mPa·s.

All viscosities concerned with in the present account correspond to a dynamic viscosity quantity at 25° C. referred to as "newtonian", that is to say the dynamic viscosity which is measured, in a way known per se, at a shear rate gradient which is sufficiently low for the viscosity measured to be independent of the rate gradient.

The polyorganosiloxane (I.1) can exhibit a linear, branched or cyclic structure. Its degree of polymerization is preferably between 2 and 5000.

Examples of siloxyl units of formula (I.1) are the vinyldimethylsiloxane unit, the vinylphenylmethylsiloxane unit and the vinylsiloxane unit.

Examples of polyorganosiloxanes (I.1) are dimethylpolysiloxanes comprising dimethylvinylsilyl ends, methylvinyldimethylpolysiloxane copolymers comprising trimethylsilyl ends, methylvinyldimethylpolysiloxane copolymers comprising dimethylvinylsilyl ends, or cyclic methylvinylpolysiloxanes.

The crosslinking polyorganosiloxane (I.2) is preferably of the type of those comprising siloxyl units of formula:

$$H_d L_e SiO_{\frac{4-(d+e)}{2}} \qquad (I.2)$$

in which:
L is a monovalent hydrocarbonaceous group which has no unfavorable effect on the activity of the catalyst and which is preferably chosen from alkyl groups having from 1 to 8 carbon atoms inclusive, advantageously from the methyl, ethyl, propyl and 3,3,3-trifluoropropyl groups, and from aryl groups, advantageously from the xylyl, tolyl and phenyl radicals,
d is 1 or 2, e is 0, 1 or 2 and d+e has a value of between 1 and 3.

The dynamic viscosity $\eta_d$ (at 25° C.) of this polyorganosiloxane (I.2) is ≧5, preferably ≧10, and more preferably still is between 20 and 1000 mPa·s.

The polyorganosiloxane (I.2) can exhibit a linear, branched or cyclic structure. The degree of polymerization is greater than or equal to 2. More generally, it is less than 5000.

Examples of units of formula (I.2) are:

M': H(CH$_3$)$_2$SiO$_{1/2}$, D': HCH$_3$SiO$_{2/2}$, D': H(C$_6$H$_5$)SiO$_{2/2}$.

Examples of polyorganosiloxane (I.2) are:
- M'DD': dimethylpolysiloxanes comprising hydrodimethylsilyl ends, poly(dimethylsiloxane)-(methylhydrosiloxyl) α,ω-dimethylhydro-siloxane,
- M'DD': copolymers comprising dimethyl(hydro-methyl) polysiloxane (dimethyl) units comprising trimethylsilyl ends,
- M'DD': copolymers comprising dimethyl-(hydromethyl) polysiloxane units comprising hydrodimethylsilyl ends,
- MD': hydromethylpolysiloxanes comprising trimethylsilyl ends,
- D'$_4$: cyclic hydromethylpolysiloxanes.

The polyaddition silicone composition bases may comprise only linear polyorganosiloxanes (I.1) and (I.2), such as, for example, those disclosed in patents: U.S. Pat. No. 3,220,972, U.S. Pat. No. 3,697,473 and U.S. Pat. No. 4,340,709.

The catalysts (II) are also well known. Use is preferably made of platinum and rhodium compounds. It is possible in particular to use the complexes of platinum and of an organic product disclosed in patents U.S. Pat. No. 3,159,601, U.S. Pat. No. 3,159,602 and U.S. Pat. No. 3,220,972 and European Patents EP-A-0 057 459, EP-A-0 188 978 and EP-A-0 190 530, or the complexes of platinum and of vinylated organosiloxanes disclosed in patents U.S. Pat. No. 3,419,593, U.S. Pat. No. 3,715,334, U.S. Pat. No. 3,377,432 and U.S. Pat. No. 3,814,730. The catalyst generally preferred is platinum. In this case, the amount by weight of catalyst (II), calculated as weight of platinum metal, is generally between 2 and 400 ppm, preferably between 5 and 200 ppm, based on the total weight of the polyorganosiloxanes (I.1) and (I.2).

Preferably, the crosslinking POS exhibits an $\equiv$Si—H/$\equiv$Si-alkenyl (Vi) molar ratio such that:

$$1.0 \leq \equiv\text{Si—H}/\equiv\text{Si-alkenyl (Vi)} \leq 4$$

preferably $$1.4 \leq \equiv\text{Si—H}/\equiv\text{Si-alkenyl (Vi)} \leq 3.$$

It is advantageous for the POS (I.1) to be a blocked linear polydiorganosiloxane comprising "Si-alkenyl" functional groups, preferably located at the chain end, exhibiting a viscosity of the order of 100 to 1000 mPa·s and a level of alkenyl functional groups $_ia$, expressed as equivalent number of alkenyl functional groups per 100 g of oil, of:

$$0.01 \leq l_a$$

preferably $$0.015 \leq l_a \leq 0.04$$

and more preferably still $$0.015 \leq l_a \leq 0.1.$$

Likewise, the oil of use as crosslinking agent comprising at least one POS comprising $\equiv$Si—H functional groups (I.2) exhibits, preferably, a viscosity of the order of 5 to 150 mPa·s.

The complete curable compositions are fluid at standard temperature; their viscosity is generally of the order of 50 to 500 mPa·s at 25° C.

According to an alternative form, the release crosslinkable silicone composition includes:
- at least one adhesion-adjusting system (III);
- and/or at least one agent for inhibiting hydrosilylation (IV), preferably chosen from acetylenic alcohols and/or diallyl maleates and their derivatives;
- optionally at least one other additive chosen from bactericides and/or antigelling agents and/or wetting agents and/or antifoaming agents and/or fillers and/or synthetic latexes and/or colorants and/or acidifying agents.

The adhesion-adjusting system (III) is selected from known systems. It can be those disclosed in French Patent FR-B-2 450 642, U.S. Pat. No. B-3,772,247 or European Patent Application EP-A-0 601 938. Mention may be made, by way of examples, of the adjusting agents based:
- on 96 to 85 parts by weight of at least one reactive polyorganosiloxane resin (A) of type: MD$^{Vi}$Q, MM$^{Vi}$Q, MD$^{Vi}$T, MM$^{hexenyl}$Q or MM$^{allyloxyprobpyl}$Q,
- on 4 to 15 parts by weight of at least one nonreactive resin (B) of type: MD'Q, MDD'Q, MDT', MQ or MDQ.

The retardant of the addition reaction (IV) (crosslinking inhibitor) can, for its part, be chosen from the following compounds:
- polyorganosiloxanes, advantageously cyclic polyorganosiloxanes, which are substituted by at least one alkenyl, tetramethylvinyltetrasiloxane being particularly preferred,
- pyridine,
- organic phosphines and phosphites,
- unsaturated amides,
- alkylated maleates,
- and acetylenic alcohols.

These acetylenic alcohols (cf. FR-B-1 528 464 and FR-A-2372 874), which are among the preferred thermal blockers for the hydrosilylation reaction, have the formula:

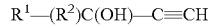

in which formula,
R$^1$ is a linear or branched alkyl radical or a phenyl radical;
R$^2$ is H, a linear or branched alkyl radical or a phenyl radical;
it being possible for the R$^1$ and R$^2$ radicals and the carbon atoms situated α to the triple bond optionally to form a ring;
the total number of carbon atoms present in R$^1$ and R$^2$ being at least 5, preferably from 9 to 20.

Said alcohols are preferably chosen from those exhibiting a boiling point of greater than 250° C. Mention may be made, by way of examples, of:
- 1-ethynyl-1-cyclohexanol;
- 3-methyl-1-dodecyn-3-ol;
- 3,7,11-trimethyl-1-dodecyn-3-ol;
- 1,1-diphenyl-2-propyn-1-ol;
- 3-ethyl-6-ethyl-1-nonyn-3-ol;
- 3-methyl-1-pentadecyn-3-ol.

These α-acetylenic alcohols are commercial products.

Such a retardant is present in a proportion of 3000 ppm at most, preferably in a proportion of 100 to 2000 ppm, with respect to the total weight of the organopolysiloxanes (I.1) and (I.2).

According to another implementational route different from the "solvent-free" one, the composition is provided in the form of an aqueous emulsion/dispersion and then comprises at least one surfactant and optionally at least one agent for fixing the pH.

The agent for fixing and maintaining the pH is preferably a buffer system comprising HCO$_3^-$/CO$_3^{2-}$ and/or H$_2$PO$_4^-$/HPO$_4^{2-}$. Thus, in order to obtain the desired buffer effect, it will be advisable to introduce, in accordance with the invention, an $HCO_3^-$ and/or $H_2PO_4^-$ salt, such as, for example, $NaHCO_3$ and/or $Na_2CO_3$ and/or $NaH_2PO_4$ and/or $Na_2HPO_4$. It is obvious that any other salt with a different counteranion (e.g. K) might be suitable. In a particularly preferred way, use is in practice made of a buffer system composed of $NaHCO_3$ which is incorporated in the emulsion.

The surfactant or surfactants capable of being present in the emulsion according to the invention as emulsifying agent are nonionic or ionic in nature.

According to an advantageous arrangement, the proportion of water in the emulsion is greater than or equal to 50% by weight, preferably greater than or equal to 55% by weight and, for example, in practice of the order of 55-60% by weight or alternatively of 85 to 90% by weight.

According to another of its subject-matters, the invention relates to a silicone composition capable of crosslinking by polyaddition to form a water-repellent and release coating for a fibrous or nonfibrous support, characterized:
in that the composition comprises:
(I.1) at least one POS exhibiting, per molecule, at least two alkenyl groups (preferably $C_2$-$C_6$ alkenyl groups) bonded to silicon atoms,
(I.2) at least one silicone oil:
comprising at least one hydrogenated linear PolyOrganoSiloxane (POS) exhibiting, per molecule, at least three hydrogen atoms bonded to silicon atoms,
and having the following mean linear formula:

$$M_\alpha M'_\beta D_\gamma D'_\delta$$

with
$M=(R^1)_3SiO_{1/2}$
$M'=H_a(R^1)_b SiO_{1/2}$, a+b=3, a=1, 2 or 3, b=0 to 3
$D=(R^2)_2SiO_{2/2}$
$D'=HR^3SiO_{2/2}$
$0 \leq \alpha \leq 2$
$0 < \beta \leq 2$
$0 < \gamma$
$0 < \delta$
and with:
$0 < \gamma/\delta \leq 0.4$,
$20 \leq (\beta/\delta) \times 1000 \leq 60$,
at least one catalyst (II) composed of at least one metal belonging to the platinum group; said catalyst being present at a level of metal catalyst being of less than or equal to 80 ppm, preferably of less than or equal to 65 ppm and more preferably still of between 30 and 55 ppm;
and in that the POS or POSs of higher viscosity which it comprises has (have) a dynamic viscosity η at 25° C. of less than or equal to 1500 mPa·s.

To define the composition according to the invention, reference is made to the characteristics defined above in the context of the description of the use.

According to another of its aspects, the present invention relates to a process for the preparation of a silicone composition which can be used in particular as coating base for the preparation of release and water-repellent coatings, this composition being of the type of that defined above. According to this process, at least one (preferably linear) ≡Si-Vi POS oil (I.1) is mixed with the crosslinking agent composed of at least one ≡Si—H POS oil (I.2) of MM'DD' type and/or of a mixture of oils comprising (preferably linear) POS molecules each carrying a portion of the MM'DD' units present in the crosslinking agent. The catalyst (II) is also incorporated in the silicone phase with the optional other ingredients, such as the crosslinking inhibitors.

The mixing means and methodologies are known to a person skilled in the art, whether solvent-comprising, solvent-free or emulsion compositions.

These compositions can be applied using devices employed on industrial equipment for the coating of paper, such as a five-roll coating head, an air knife system or an equalizer bar system, to flexible supports or materials and can then be cured by moving through tunnel ovens heated to 70-200° C.; the passage time in these ovens depends on the temperature; this time is generally of the order of 5 to 15 seconds at a temperature of the order of 100° C. and of the order Of 1.5 to 3 seconds at a temperature of the order of 180° C.

Said compositions can be deposited on any flexible material or substrate, such as paper of various types (supercalendered, coated, glassine), board, cellulose sheets, metal sheets, plastic films (polyester, polyethylene, polypropylene, and the like), and the like.

The amounts of compositions deposited are of the order of 0.5 to 2 g per $m^2$ of surface to be treated, which corresponds to the deposition of layers of the order of 0.5 to 2 μm.

The materials or supports thus coated can subsequently be brought into contact with any pressure-sensitive adhesive material of rubber, acrylic or other nature. The adhesive material is then easily detachable from said support or material.

According to another of its aspects, the present invention relates to a support, characterized in that it comprises at least one release coating obtained:
in accordance with the use as defined above,
and/or from a composition as defined above.

The following examples are given by way of indication and may not be regarded as a limitation on the scope and spirit of the invention.

EXAMPLES

1) Coating/Crosslinking of the Silicone Coating According to a Specific Methodology M The silicone composition is coated on a Rotomec pilot-scale coating plant (while maintaining a residence time in the ovens of 1.8 s) on a glassine 9564 paper support, the Bekk smoothness of which is of the order of 1020.

The temperature of the silicone layer is measured in-line using an infrared camera. The temperature of the support is of the order of 150° C.

2). Characterization of the Crosslinked Silicone Coating on the Support

The coating, after coating and crosslinking, is characterized by the following tests:
Weight of the silicone coating: the silicon atoms of the coating are excited using a radioactive source or an X-ray fluorescence tube and the X-ray intensity reemitted by the coating is measured. The weight of the silicone coating is thus determined using calibration. The device used is a Lab X1000 device sold by Oxford.
Level of extractables (at the outlet of the coating device: in-line/4 days after crosslinking: off-line): the test consists in immersing the coating in toluene and in then quantitatively determining by Perkin-Elmer 3100 atomic absorption spectrophotometry (the silicone having transferred into the solvent). The level of silicone extractable from the coating is determined using calibration.

Crosslinking: the level of polymerization of the coating at the outlet of the coating device is described using a number of trade tests: the smear test, where the oily nature of the surface is described by passing the finger over the silicone surface.

The rub off test (Test T), which characterizes the attachment to the support. In practice, the finger is rubbed over the surface of the coating and the number of passes starting from which the coating deteriorates/detaches is recorded. A grading of 10 (10 passes) is regarded as acceptable for the application: POSITIVE ATTACHMENT.

Detachment force: the test used corresponds to the Finat No. 3 and 10 standards of edition No. 5 of 1999. This test is carried out 4 days after crosslinking (off-line) with adhesive tapes sold under the Tesa® 7475 trademark at 23° C. (acrylic base) and the Tesa® 7476 trademark at 70° C. (rubber base).

Monitoring of the performance of pressure-free instantaneous adhesion, tack, of the PSA after contact with the silicone coating according to the No. 9 standard of the Finat edition No. 5 of 1999.

3) Products Used

Silicone oil vinylated in the chain and at the chain end (I.1): vinylated PolyDiMethylSiloxane oil with 0.033 mol of Vi/100 g and with a viscosity at 25° C.=230 mPa·s. This oil comprises 0.15% of EthylCycloHexanol inhibitor (IV).

Adjusting agent (III) which is a mixture of vinylated silicone oil and of a vinylated MQ resin (50/50 mixture) comprising 0.107 Vi groups/100 g. This adjusting agent comprises 0.15% of ECH inhibitor (IV).

Catalyst (II): Karstedt Pt comprising 2000 ppm of Pt.

Crosslinking agent (I.2) based on hydrogenated PDMS silicone oil or a mixture thereof: the characteristics of these products are given in the following table.

4) The Tests and Their Results 4.1 TESTS

Several hydrogenated silicone oils were tested comparatively. The characteristics of these oils are given in the following table 1.

TABLE 1

| Tests | Structure | $\gamma/\delta = D/D'$ | $1000 \times \beta/\delta = 1000 \times M'/D'$ |
|---|---|---|---|
| 1 | $M_{1.2}D_6D'_{30}M'_{0.8}$ | 0.2 | 26.7 |
| 2 | $M_{0.8}D_4D'_{25}M'_{1.2}$ | 0.16 | 48 |
| 3 | $M_{1.3}D_{17}D'_{33}M'_{0.7}$ | 0.52 | 21.2 |
| 4 | $M_{1.5}D_{13.7}D'_{26}M'_{0.5}$ | 0.8 | 23 |
| 5 | $M_{0.8}D_{29}D'_{21}M'_{1.2}$ | 1.5 | 57.1 |
| 6 | $M_{1.4}D_{21}D'_{16.6}M'_{0.6}$ | 1.25 | 35.7 |
| 7 | $M_{1.2}D'_{30}M'_{0.8}$ | 0 | 26.7 |
| 8 | $M_{1.7}D_8D'_{42}M'_{0.3}$ | 0.208 | 7.14 |
| 9 | $M_{1.7}D_{10.5}D'_{33.4}M'_{0.3}$ | 0.316 | 9 |
| 10 | $M_{1.6}D'_{40}M'_{0.4}$ | 0 | 10 |
| 11 | $M_1D_5D'_{25}M'_1$ | 0.2 | 40 |

These crosslinking agents are formulated with vinylated oil (I.1), the adjusting agent (I.3) and the catalyst (II).

The formulating rules followed are:

Si—H/Si-Vi ratio of 2.2 level of Pt in the final formulation: 60 ppm level of adjusting agent of 40%.

4.2-FORMULAE

TABLE 2

|  | A | B | C | D | E | F | G | H | I | J | K |
|---|---|---|---|---|---|---|---|---|---|---|---|
| Si—Vi oil (I.1) | 60 | 60 | 60 | 60 | 60 | 60 | 60 | 60 | 60 | 60 | 60 |
| Adjusting agent (III) | 40 | 40 | 40 | 40 | 40 | 40 | 40 | 40 | 40 | 40 | 40 |
| Si—H crosslinking agent (I.2), test 9 | 11.6 | | | | | | | | | | |
| Si—H crosslinking agent (I.2), test 4 | | 10.7 | | | | | | | | | |
| Si—H crosslinking agent (I.2), test 6 | | | 18.2 | | | | | | | | |
| Si—H crosslinking agent (I.2), test 8 | | | | 10 | | | | | | | |
| Si—H crosslinking agent (I.2), test 3 | | | | | 13.4 | | | | | | |
| Si—H crosslinking agent (I.2), test 5 | | | | | | 21 | | | | | |
| Si—H crosslinking agent (I.2), test 7 | | | | | | | 8.2 | | | | |
| Si—H | | | | | | | | 8.2 | | | |

TABLE 2-continued

|  | A | B | C | D | E | F | G | H | I | J | K |
|---|---|---|---|---|---|---|---|---|---|---|---|
| crosslinking agent (I.2), test 10 Si—H |  |  |  |  |  |  |  |  | 10 |  |  |
| crosslinking agent (I.2), test 1 Si—H |  |  |  |  |  |  |  |  |  | 10 |  |
| crosslinking agent (I.2), test 11 Si—H |  |  |  |  |  |  |  |  |  |  | 10.2 |
| crosslinking agent (I.2), test 2 |  |  |  |  |  |  |  |  |  |  |  |
| Cata II | 3.5 | 3.5 | 3.7 | 3.5 | 3.6 | 3.8 | 3.4 | 3.4 | 3.5 | 3.5 | 3.5 |

These formulations are coated on a glassine paper, ref 9564, with a Bekk smoothness of the order of 1020, from Ahlstrom; the weight of silicone deposited is of the order of 1.2 g/m². The crosslinking conditions over 1.8 s with a temperature of the coating of 150° C.

4.3-ATTACHMENT AND EXTRACTABLES EVALUATION

The performances in the rub off test and the level of extractables at the oven outlet of the formulations evaluated have been combined in the following table 3. It should be remembered here that the aim is to find a low level of extractables (sign of exhaustive polymerization) and good behavior in the rub off test.

TABLE 3

| Tests | Structure | $\gamma/\delta$ = D/D' | $1000 \times \beta/\delta$ = $1000 \times$ M'/D' | Attachment | Extractables |
|---|---|---|---|---|---|
| 1 Invention | $M_{1.2}D_6D'_{30}M'_{0.8}$ | 0.2 | 26.7 | YES | 6.50% |
| 2 Invention | $M_{0.8}D_4D'_{25}M'_{1.2}$ | 0.16 | 48 | YES | 5.80% |
| 3 Comparative | $M_{1.3}D_{17}D'_{33}M'_{0.7}$ | 0.52 | 21.2 | NO | 4.40% |
| 4 Comparative | $M_{1.5}D_{13.7}D'_{26}M'_{0.5}$ | 0.8 | 23 | NO | 4.00% |
| 5 Comparative | $M_{0.8}D_{29}D'_{21}M'_{1.2}$ | 1.5 | 57.1 | NO | 3.40% |
| 6 Comparative | $M_{1.4}D_{21}D'_{16.6}M'_{0.6}$ | 1.25 | 35.7 | NO | 3.20% |
| 7 Comparative | $M_{1.2}D'_{30}M'_{0.8}$ | 0 | 26.7 | YES | 11.10% |
| 8 Comparative | $M_{1.7}D_8D'_{42}M'_{0.3}$ | 0.208 | 7.14 | YES | 10.00% |
| 9 Comparative | $M_{1.7}D_{10.5}D'_{33.4}M'_{0.3}$ | 0.316 | 9 | YES | 9.90% |
| 10 Comparative | $M_{1.6}D'_{40}M'_{0.4}$ | 0 | 10 | YES | 9.10% |
| 11 Invention | $M_1D_5D'_{25}M'_1$ | 0.2 | 40 | YES | 6.20% |

It is clearly seen that the crosslinking agents (1.2) according to the invention with the ≡Si—H POS structure M'MD'D (tests 1, 2 and 11) make it possible to obtain the lowest levels of extractables, the mark of better reactivity, with good attachment to the support. By virtue of the invention, formulations are accessible which can be crosslinked at a low level of Pt.

What is claimed is:

1. A crosslinking agent (I.2), for use in a silicone composition capable of crosslinking by polyaddition in the presence of a metal catalyst to form a water-repellent and release coating for a fibrous or nonfibrous support,
   of at least one silicone oil comprising at least one hydrogenated (optionally linear) PolyOrganoSiloxane (POS) exhibiting, per molecule, at least three hydrogen atoms bonded to silicon atoms, and having the following mean formula:

$$M_\alpha M'_\beta D_\gamma D'_\delta$$

with $M=(R^1)_3SiO_{1/2}$
   $M'=H_a(R^1)_bSiO_{1/2}$, a+b=3, a=1, 2 or 3,
   b=0 to 3
   $D=(R^2)_2SiO_{2/2}$
   $D'=HR^3SiO_{2/2}$
   $0 \leq \alpha \leq 2$
   $0 < \beta \leq 2$
   $0 < \gamma$
   $0 < \delta$
   and with:
   $0 < \gamma/\delta \leq 0.4$,
   $20 \leq (\beta/\delta) \times 1000 \leq 60$, and wherein $R^1, R^2$ and $R^3$ are alkyl groups having from 1 to 8 carbon atoms,
   the POS having a dynamic viscosity η at 25° C. of less than or equal to 1500 mPa·s.

2. A silicone composition comprising a crosslinking agent capable of crosslinking by polyaddition in the presence of a metal catalyst to form a water-repellent and release coating for a fibrous or nonfibrous support,
   of at least one silicone oil comprising at least one hydrogenated (optionally linear) PolyOrganoSiloxane (POS) exhibiting, per molecule, at least three hydrogen atoms bonded to silicon atoms, and having the following mean formula:

$$M_\alpha M'_\beta D_\gamma D'_\delta$$

with $M=(R^1)_3SiO_{1/2}$
   $M'=H_a(R^1)_bSiO_{1/2}$, a+b=3, a=1, 2 or 3,
   b=0 to 3

D=$(R^2)^3SiO_{2/2}$
D'=$HR^3SiO_{2/2}$
$0 \leq \alpha \leq 2$
$0 \leq \beta \leq 2$
$0 < \gamma$
$0 < \delta$
and with:
$0 < \gamma/\delta \leq 0.4$,
$20 \leq (\beta/\delta) \times 1000 \leq 60$, and wherein $R^1, R^2$ and $R^3$ are alkyl groups having from 1 to 8 carbon atoms,
the POS having a dynamic viscosity η at 25° C. of less than or equal to 1500 mPa·s;
the level of metal catalyst being less than or equal to 80 ppm, wherein the silicone composition is such that it can be converted to a croddlinked silicone elastomer coating on a support made of paper with a Bekk smoothness of greater than 1,000, said coating having a postive attachment in a specific test T.

3. A coated support comprising a coating comprised of a silicone composition comprising a crosslinking agent capable of crosslinking by polyaddition in the presence of a metal catalyst to form a water-repellent and release coating for a fibrous or nonfibrous support; the crosslinking agent comprising
at least one silicone oil comprising at least one hydrogenated (optionally linear) PolyOrganoSiloxane (POS) exhibiting, per molecule, at least three hydrogen atoms bonded to silicon atoms, and having the following mean formula:

$M_\alpha M'_\beta D_\gamma D'_\delta$ with M=(R=$(R^1)_3SiO_{1/2}$
M'=$H_a(R^1)_b SiO_{1/2}$, a+b=3, a=1, 2 or 3, b=0 to 3
D=$(R^2)_2 SiO_{2/2}$
D'=$HR^3 SiO_{2/2}$
$0 \leq \alpha \leq 2$
$0 \leq \beta \leq 2$
$0 < \gamma$
$0 < \delta$
and with:
$0 < \gamma/\delta \leq 0.4$,
$20 \leq (\beta/\delta) \times 1000 \leq 60$, and wherein $R^1$, $R^2$ and R3 are alkyl groups having from 1 to 8 carbon atoms,
the POS having a dynamic viscosity η at 25° C. of less than or equal to 1500 mPa·s;
the level of metal catalyst being less than or equal to 80 ppm, wherein the silicone composition is such that it can be converted to a crosslinked silicone elastomer coating on a heat-sensitive material, optionally selected from flexible supports made of paper, board, flexible supports composed of the adhesive face of a label or of a tape of the same kind, woven or nonwoven fibrous flexible supports, flexible supports comprising polyethylene and/or polypropylene and/or polyester and/or poly(vinyl chloride), and/or thermally printable flexible supports.

4. The support as claimed in claim 3, wherein, for the crosslinking of the coating, the support is placed at a temperature of less than or equal to 110° C., for less than 60 seconds.

5. The composition agent as claimed in claim 2, wherein the composition is a mixture formed of:
(I.1) at least one ≡Si-alkenyl POS exhibiting, per molecule, at least two alkenyl groups bonded to silicon atoms,
(I.2) at least one crosslinking ≡Si—H POS as defined above,
(I.3) and/or at least one POS carrying Si-alkenyl and Si—H units,
(II) at least one catalyst (II) comprising at least one metal belonging to the platinum group.

6. The composition as claimed in claim 5, wherein the crosslinking POS exhibits an ≡Si—H/≡Si-alkenyl (Vi) molar ratio such that:

$1.0 \leq \equiv Si-H/\equiv Si\text{-alkenyl}(Vi) \leq 4$.

7. The composition as claimed in claim 6, wherein the POS (I.1) is a product comprising units of formula:

$$W_a Z_b SiO_{\frac{4-(a+b)}{2}} \quad (I.1)$$

in which:
W is an alkenyl group,
Z is a monovalent hydrocarbonaceous group which has no unfavorable effect on the activity of the catalyst and which is selected from alkyl groups having from 1 to 8 carbon atoms inclusive, optionally from the methyl, ethyl, propyl and 3,3,3-trifluoropropyl groups, and also from aryl groups, optionally from the xylyl, tolyl and phenyl radicals,
a is 1 or 2, b is 0, 1 or 2 and a+b is between 1 and 3.

8. The composition as claimed in claim 2, wherein the release crosslinkable silicone composition futher comprises:
at least one adhesion-adjusting system (III),
and/or at least one agent for inhibiting hydrosilylation (IV).

9. The crosslinking agent as claimed in claim 5, wherein the POS (I.1) is a blocked linear polydiorganosiloxane comprising "Si-alkenyl" functional groups, exhibiting a viscosity of the order of 100 to 1000 mPa·s and a level of alkenyl functional groups $I_a$, expressed as equivalent number of alkenyl functional groups per 100 g of oil, of:
$0.010 \leq 1_a$.

10. The composition as claimed in claim 5, wherein at least one POS comprising ≡Si—H functional groups (I.2) exhibits a viscosity of the order of 5 to 150 mPa·s.

11. The composition as claimed in claim 2, wherein the composition is provided in the form of an aqueous emulsion/dispersion.

12. A silicone composition capable of crosslinking by polyaddition to form a water-repellent and release coating for a fibrous or nonfibrous support, wherein the composition comprises:
(I.1) at least one POS exhibiting, per molecule, at least two alkenyl groups bonded to silicon atoms,
(I.2) at least one silicone oil:
comprising at least one hydrogenated linear PolyOrganoSiloxane (POS) exhibiting, per molecule, at least three hydrogen atoms bonded to silicon atoms,
and having the following mean linear formula:

$M_\alpha M'_\beta D_\gamma D'_\delta$ with M=$(R^1)_3 SiO_{1/2}$
M'=$H_a(R^1)_b SiO_{1/2}$, a+b=3, a=1, 2 or 3, b=0 to 3
D=$(R^2)_2 SiO_{2/2}$
D'=$HR^3 SiO_{2/2}$
$0 \leq \alpha \leq 2$
$0 < \beta \leq 2$
$0 < \gamma$
$0 < \delta$ and with:

$0 < \gamma/\delta \leq 0.4$, $20 \leq (\beta/\delta) \times 1000 \leq 60$, and wherein $R^1$, $R^2$ and R3 are alkyl groups having from 1 to 8 carbon atoms, at least one catalyst (II) comprising at least one metal belonging to the platinum group; said catalyst being present at a level of metal catalyst being of less than or equal to 80 ppm;

and in that the POS has a dynamic viscosity $1\eta$ at 25° C. of less than or equal to 1500 mPa·s.

13. A composition prepared using the crosslinking agent as claimed in claim 1.

14. A support comprising at least one release coating obtained crosslinking the coating composition with the crosslinking agent as claimed in claim 1.

* * * * *